US011041623B2

(12) United States Patent
Bolanos et al.

(10) Patent No.: US 11,041,623 B2
(45) Date of Patent: Jun. 22, 2021

(54) GAS TURBINE COMBUSTOR WITH HEAT EXCHANGER BETWEEN RICH COMBUSTION ZONE AND SECONDARY COMBUSTION ZONE

(71) Applicant: General Electric Company, Schenectady, NY (US)

(72) Inventors: Felipe Bolanos, Baden (CH); Torsten Wind, Hallwill (CH); Fernando Biagioli, Fislisbach (CH)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 15/978,635

(22) Filed: May 14, 2018

(65) Prior Publication Data

US 2018/0372318 A1 Dec. 27, 2018

(30) Foreign Application Priority Data

Jun. 21, 2017 (EP) .................................. 17177065

(51) Int. Cl.
*F23R 3/00* (2006.01)
*F23R 3/28* (2006.01)
(Continued)

(52) U.S. Cl.
CPC ................ *F23R 3/005* (2013.01); *F02C 3/04* (2013.01); *F02C 7/18* (2013.01); *F02C 7/222* (2013.01);
(Continued)

(58) Field of Classification Search
CPC .. F23R 3/346; F23R 3/005; F23R 3/04; F23R 3/34; F23R 3/236; F23R 2900/03341;
(Continued)

(56) References Cited

U.S. PATENT DOCUMENTS

| 3,433,015 A | 3/1969 | Sneeden |
| 3,969,892 A * | 7/1976 | Stettler ..................... F02C 3/34 |
| | | 60/39.511 |

(Continued)

FOREIGN PATENT DOCUMENTS

| EP | 1620679 A2 | 2/2006 |
| EP | 3037726 A1 | 6/2016 |
| EP | 3228937 A1 | 10/2017 |

OTHER PUBLICATIONS

Extended European Search Report and Opinion issued in connection with corresponding EP Application No. 17177065.4 dated Dec. 13, 2017.

*Primary Examiner* — Scott J Walthour
*Assistant Examiner* — Todd N Jordan
(74) *Attorney, Agent, or Firm* — Dority & Manning, P.A.

(57) ABSTRACT

A combustor for a turbomachine includes a rich combustion zone and a low temperature zone downstream of the rich combustion zone. A heat exchanger is positioned downstream of the rich combustion zone and upstream of the low temperature zone. The heat exchanger includes a plurality of air passages, a plurality of air inlets in fluid communication with the plurality of air passages, and a plurality of combustion gas passages. Each of the combustion gas passages extends between a combustion gas inlet in fluid communication with the rich combustion zone and a combustion gas outlet in fluid communication with the low temperature zone. The plurality of combustion gas passages are in thermal communication with the plurality of air passages.

6 Claims, 5 Drawing Sheets

(51) Int. Cl.
*F23R 3/14* (2006.01)
*F23R 3/34* (2006.01)
*F23R 3/18* (2006.01)
*F02C 3/04* (2006.01)
*F02C 7/18* (2006.01)
*F02C 7/22* (2006.01)

(52) U.S. Cl.
CPC ............... *F23R 3/14* (2013.01); *F23R 3/18* (2013.01); *F23R 3/286* (2013.01); *F23R 3/346* (2013.01); *F23C 2201/401* (2013.01); *F23R 2900/03341* (2013.01)

(58) Field of Classification Search
CPC .......... F02C 7/10; F02C 7/08; F23C 2201/40; F23C 2201/401
See application file for complete search history.

(56) References Cited

U.S. PATENT DOCUMENTS 4,240,784 A * 12/1980 Dauvergne ............. F23C 6/045
239/427.3
5,239,818 A * 8/1993 Stickles .................. F23R 3/04
60/737

* cited by examiner

GAS TURBINE COMBUSTOR WITH HEAT EXCHANGER BETWEEN RICH COMBUSTION ZONE AND SECONDARY COMBUSTION ZONE

FIELD

The subject matter disclosed herein relates to a combustor for a turbomachine. More specifically, the disclosure is directed to a combustor with multiple combustion zones.

BACKGROUND

A typical gas turbine includes an inlet section, a compressor section, a combustion section, a turbine section, and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel are mixed within the combustion section and burned in a combustion chamber to generate combustion gases having a high temperature and pressure. The combustion gases are routed along through a hot gas path into the turbine section where they expand to produce work. For example, expansion of the combustion gases in the turbine section may rotate a shaft connected to a generator to produce electricity.

The combustion section generally includes one or more combustors annularly arranged and disposed between the compressor section and the turbine section. Various parameters influence the design and operation of the combustors. For example, gas turbine manufacturers are regularly tasked to increase gas turbine efficiency without producing undesirable emissions. The primary emissions of concern typically produced by gas turbines burning conventional hydrocarbon fuels are oxides of nitrogen (NOx), carbon monoxide (CO), and unburned hydrocarbons (UHCs). Oxidation of molecular nitrogen and thus the formation of NOx in air breathing engines such as gas turbines is an exponential function of temperature. The higher the temperature of the combustion gases, the higher the rate of formation of the undesirable NOx emissions.

One way to lower the temperature of the combustion gases, thus controlling the formation of NOx, is to deploy a lean pre-mix combustion system. The lean pre-mix combustion system operates by pre-mixing a gaseous fuel and working fluid to provide a lean (or air rich) pre-mixed combustible mixture to the combustion chamber. As a result, during combustion the heat capacity or thermal capacitance of the excess air present in the air rich or lean combustible mixture allows for heat absorption within the combustion chamber, thus reducing the temperature of the combustion gases, thereby reducing the formation of NOx emissions.

In some instances, it may be desirable for the combustion system to be able to combust liquid fuels, such as distillate oil. Typical prior art solutions provide the liquid fuel as a fuel stream sprayed directly into or adjacent to an ignition source. This fuel stream is a relatively rich fuel mixture, as opposed to the relatively lean pre-mixed air/fuel mixture obtained when using the gaseous fuel. Consequently, the temperature of the combusted liquid fuel mixture and the resulting rate of NOx formation are typically undesirably high. To lower the temperature and NOx level, a diluent such as water and compressed atomizing air is typically supplied and mixed with the liquid fuel as the fuel is sprayed into the ignition source. However, this system is relatively inefficient. For example, independent systems must be utilized to supply the water and to supply and compress the atomizing air.

The generation of certain combustion byproducts such as UHCs is minimized when the fuel is combusted completely, which is referred to as stoichiometric combustion. However, the temperature of stoichiometric combustion is typically higher than would be desired with respect to NOx production.

BRIEF DESCRIPTION

Aspects and advantages will be set forth in part in the following description, or may be obvious from the description, or may be learned through practice.

In accordance with one embodiment of the present disclosure, a combustor for a turbomachine is provided. The combustor includes a rich combustion zone and a low temperature zone downstream of the rich combustion zone. A heat exchanger is positioned downstream of the rich combustion zone and upstream of the low temperature zone. The heat exchanger includes a plurality of air passages, a plurality of air inlets in fluid communication with the plurality of air passages, and a plurality of combustion gas passages. Each of the combustion gas passages extends between a combustion gas inlet in fluid communication with the rich combustion zone and a combustion gas outlet in fluid communication with the low temperature zone. The plurality of combustion gas passages are in thermal communication with the plurality of air passages.

In accordance with another embodiment of the present disclosure, a method of operating a combustor of a turbomachine is provided, the combustor is a single-stage combustor. The method includes supplying a fuel to the combustor from a fuel supply and flowing compressed air to the combustor. The method also includes mixing a first portion of the compressed air with the fuel from the fuel supply and combusting the mixed fuel and air in a rich combustion zone to create combustion gases. The method further includes flowing the combustion gases through a heat exchanger downstream of the rich combustion zone and flowing a second portion of the compressed air through the heat exchanger such that the combustion gases and the second portion of the compressed air are in thermal communication within the heat exchanger.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present embodiments, including the best mode thereof, directed to one of ordinary skill in the art, is set forth in the specification, which makes reference to the appended figures, in which.

DETAILED DESCRIPTION

Reference now will be made in detail to various embodiments, one or more examples of which are illustrated in the drawings. Each example is provided by way of explanation, not limitation. In fact, it will be apparent to those skilled in the art that various modifications and variations can be made in the present disclosure without departing from the scope or spirit of the embodiments. For instance, features illustrated or described as part of one embodiment can be used with another embodiment to yield a still further embodiment. Thus, it is intended that the present embodiments cover such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially to parallel and/or coaxially aligned with an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
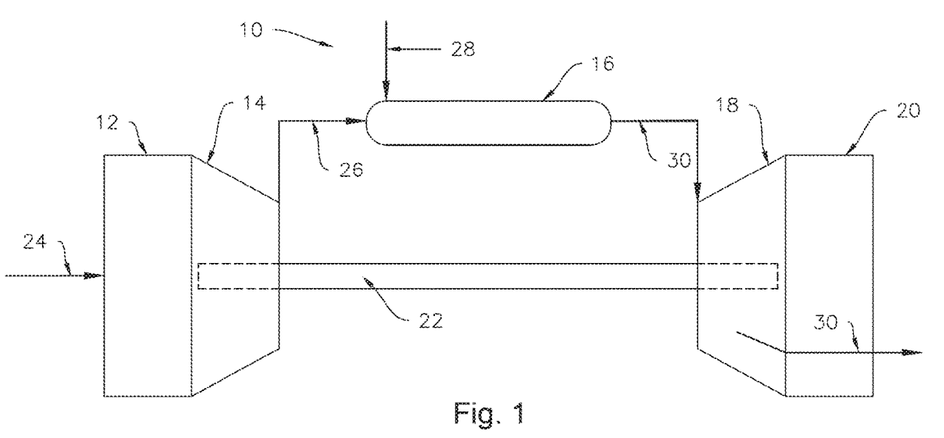
FIG. 1 is a functional block diagram of an exemplary gas turbine which may incorporate various embodiments of the present disclosure.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
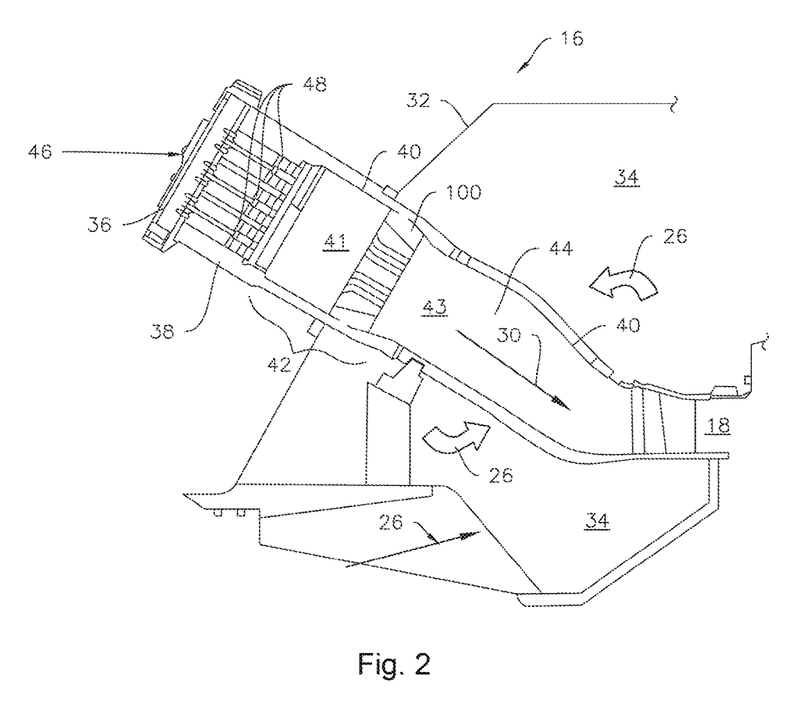
FIG. 2 is a simplified side section view of an exemplary combustor as may incorporate various embodiments of the present disclosure.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. The combustor 16 may be in fluid communication with the compressor 14 such that compressed air 26 flows from the compressor 14 to the combustor 16, e.g., via the high pressure plenum 34. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber 42 for combusting the fuel-air mixture and/or may at least partially define a hot gas path 44 through the combustor, for directing the combustion gases 30 towards an inlet to the turbine 18. As illustrated in FIG. 2, a heat exchanger 100 may be positioned in the combustion chamber 42 so as to divide the combustion chamber 42 into a rich combustion zone 41 and a low-temperature zone 43.

In various embodiments, the combustor 16 includes at least one fuel nozzle 48. As shown in FIG. 2, the fuel nozzle 48 may be coupled to the end cover 36 and extend towards the combustion chamber 42. The one or more fuel nozzles 48 may be in communication with a fuel supply 46. The compressed air 26 received in the head end 38 of the combustor 16 may thus comprise a first portion of the compressed air 26, also referred to as a combustion air portion, which flows to the fuel nozzle 48 for mixing with the fuel from fuel supply 46. In some embodiments, the combustor 16 may be configured to burn liquid fuel and the fuel supply 46 may provide liquid fuel to the combustor. Alternatively or in addition, any suitable fuel for combustion may be used, e.g., the combustor 16 may be configured to burn gaseous fuel and the fuel supply 46 may provide gaseous fuel to the combustor 16. A second portion of the compressed air 26 may comprise a bypass air flow, and may be used as a cooling air flow 27 in heat exchanger 100, as described in more detail below. Various embodiments of the combustor 16 may include different numbers and arrangements of fuel nozzles 48 and is not limited to any particular number of fuel nozzles unless otherwise specified in the claims. For example, in particular configurations the one or more fuel nozzles 48 may include multiple fuel nozzles annularly arranged about a center fuel nozzle.

According to the present disclosure, the temperature of combustion gases and hence the production of undesired emissions such as NOx may be reduced, while also providing more complete combustion at the reduced temperature. For example, some diffusion flames in turbomachine combustors have a stoichiometric temperature around 2450K, whereas the present disclosure may allow low NOx stable combustion via a diffusion flame with a lower stoichiometric temperature than a standard diffusion flame. In some embodiments, a diffusion flame may be produced having a temperature of about 2100K up to about 2300K corresponding to a global final temperature (the temperature obtained burning fuel with all the available air) of approximately 1300K up to approximately 2000K. Rich combustion temperatures may be in the range of about 1800K for equivalence ratio values around two. Accordingly, references herein such as "relatively cool diffuse flame" and/or "the low temperature zone" include relatively cool temperatures with reference to a standard diffusion flame of about 2450K. Further, as used herein, terms of approximation, such as "about," "generally," or "approximately," refer to being within ten percent above or below a stated value. Further, as used herein, such terms in the context of an angle or direction include within ten degrees.

Figure 3:
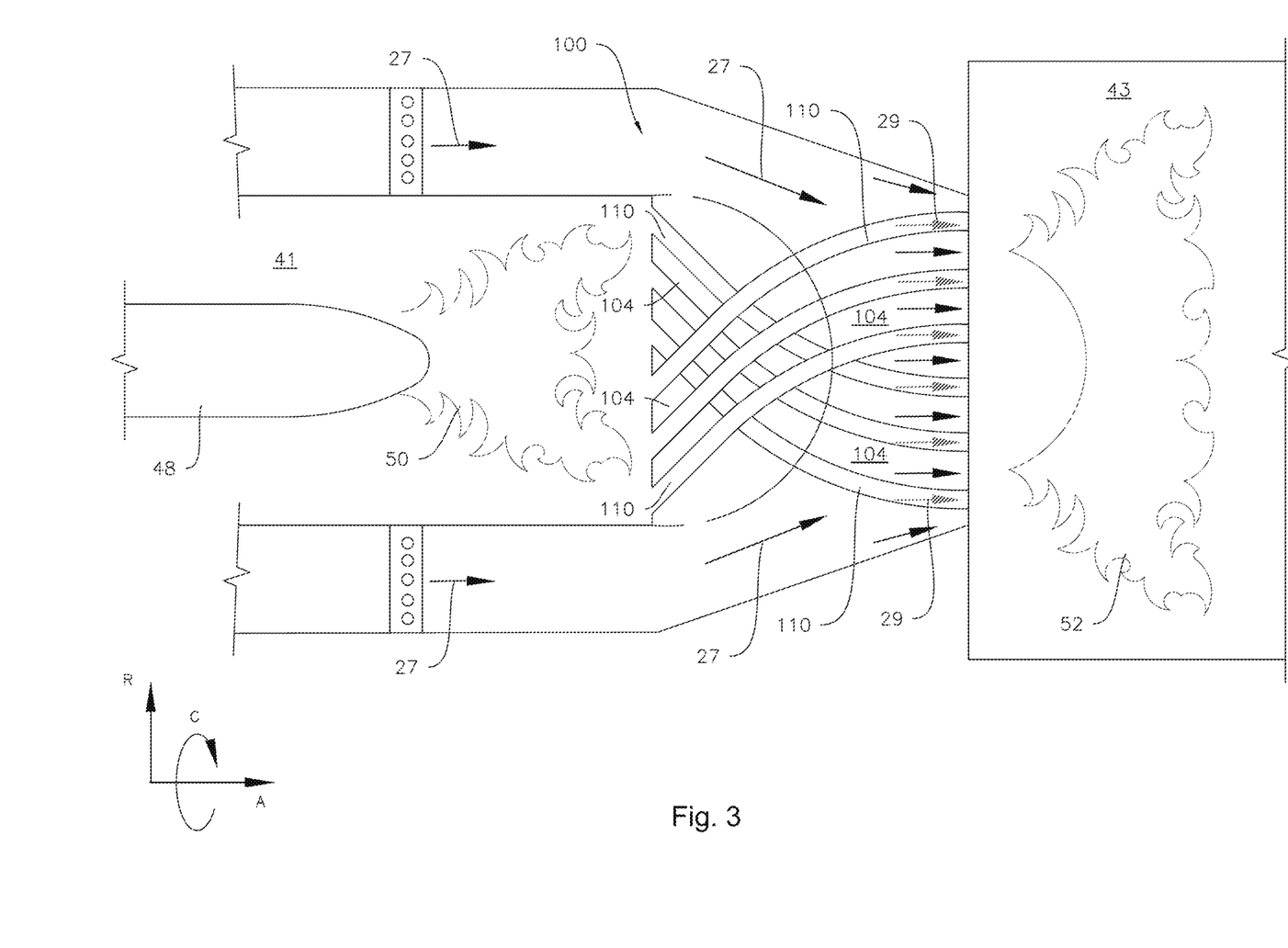
FIG. 3 is a section view of a portion of an exemplary combustor according to at least one embodiment of the present disclosure.

As shown in FIG. 3, the combustor 16 may be configured to burn a fuel, which in some embodiments may be a liquid fuel, such as a dry oil, from the fuel nozzle 48, producing a rich stage flame 50. Notably, the combustor 16 may be configured to burn liquid fuel without requiring a diluent to lower the temperature and NOx level. However, as noted above, any suitable fuel for combustion may be used. In some embodiments, the combustor 16 may be a single-stage combustor, e.g., the fuel nozzle 48 may be the only fuel supply to the combustor with no axial fuel staging. The combustion of the fuel may take place in a fuel-rich environment, such as in a rich combustion zone 41. For example, the combustion air flow may include less than about one-third of the compressed air 26, such as less than one-quarter of the compressed air 26, such as less than one tenth of the compressed air 26. The bypass flow which supplies the cooling air 27 to the heat exchanger 100 may comprise substantially the remainder of the compressed air 26. In other embodiments, a third stage may be provided, e.g., the combustor 16 may include rich combustion zone 41, diffusion flame 52 (downstream of the heat exchanger 100) in low temperature zone 43 and a sequential burner (not shown) downstream of the low temperature zone 43. In such embodiments, fuel 28 from the fuel supply 46 may be split between the rich combustion zone 41 and the sequential burner. Axial fuel staging systems such as may include a sequential burner are generally understood in the art and the sequential burner is not described in further detail herein.

The heat exchanger 100 may be positioned downstream of the rich combustion zone 41 such that combustion gases 29 from the rich combustion zone 41 may flow through the heat exchanger 100. The rich combustion gases 29 may be in thermal communication with cooling air 27, e.g., a bypass portion of the compressed air 26, within the heat exchanger 100. Thus, a low temperature zone 43 may be provided downstream of the heat exchanger 100. As illustrated, a relatively cool diffuse flame 52 may thereby be formed in the low temperature zone 43. Notably, in some embodiments, the heat exchanger 100 may not include any catalyst. Accordingly, some embodiments of the present disclosure may not include catalytic combustion.

As noted in FIG. 3 the combustor 16 may define an axial direction A, a radial direction R perpendicular to the axial direction A, and a circumferential direction C which extends around the axial direction A. As shown in FIG. 3, the heat exchanger 100 includes a plurality of air passage 104 and a plurality of combustion gas passages 110. The plurality of combustion gas passages 110 are in thermal communication with the plurality of air passages 104. Accordingly, thermal energy may be transferred from the rich combustion gases 29 to the cooling air 27, cooling the rich combustion gases 29 such that diffuse flame 52 may be provided.

Figure 4:
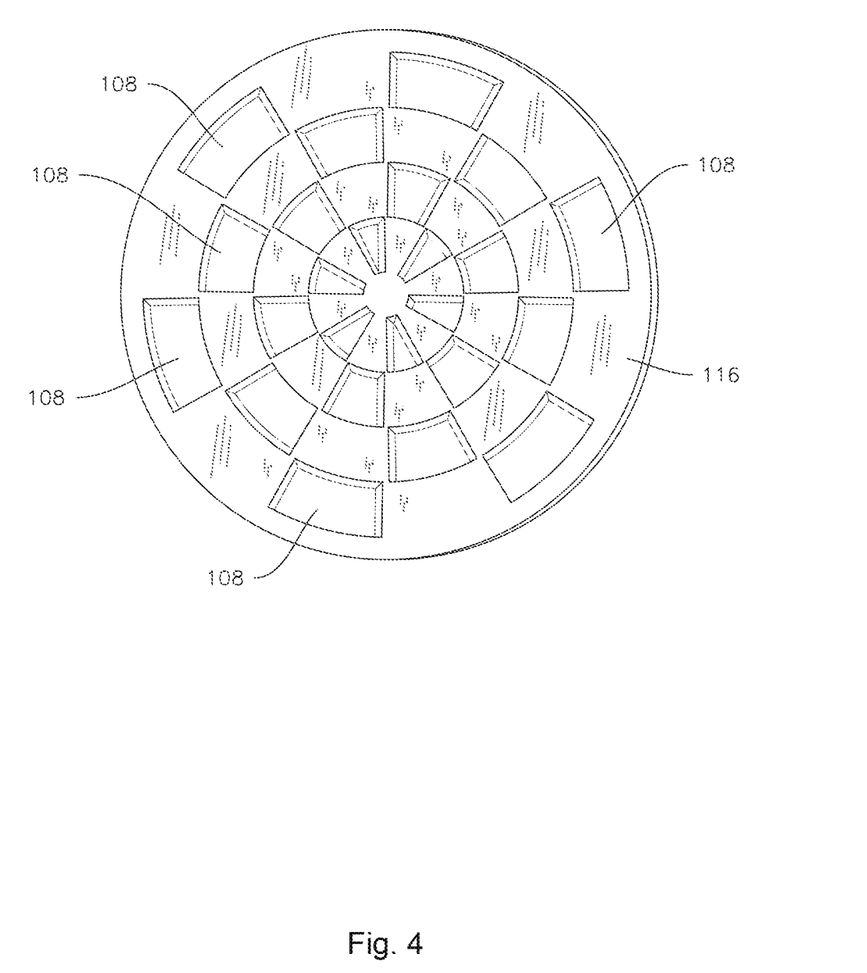
FIG. 4 is an end view of a heat exchanger according to at least one embodiment of the present disclosure.

The air passages 104 and the combustion gas passages 110 are preferably arranged in an alternating fashion. For example, in various embodiments, the heat exchanger 100 may be cylindrical. Accordingly, the air passages 104 and the combustion gas passages 110 may be arranged along the circumferential direction, e.g., forming a ring of passages. As illustrated for example in FIG. 4, the heat exchanger 100 may include multiple rings of alternating air passages 104 and combustion gas passages 110. FIG. 4 illustrates an end plate 116 which may be provided at an aft end of a housing 114 of the heat exchanger 100. The end plate 116 illustrated in FIG. 4 comprises a plurality of axially oriented combustion gas inlets 108. Between each of the axially oriented combustion gas inlets 108 the end cover 116 is blank, to effectively close off the air passages 104 (FIG. 5) from the rich combustion gas 29. In the example embodiment illustrated by FIG. 4, the heat exchanger 100 includes four rings of passages 104 and 110. However, in other embodiments, any suitable size and number of passages 104 and 110 may be provided. For example, fewer than four rings, e.g., one ring, two rings, etc., or more than four rings, e.g., five rings, eight rings, etc., may be provided. Further, the heat exchanger 100 is not necessarily cylindrical, in some embodiments, the heat exchanger may take any other shape as may be suitable, e.g., the heat exchanger may have an oval or rectangular cross-section.

Figure 5:
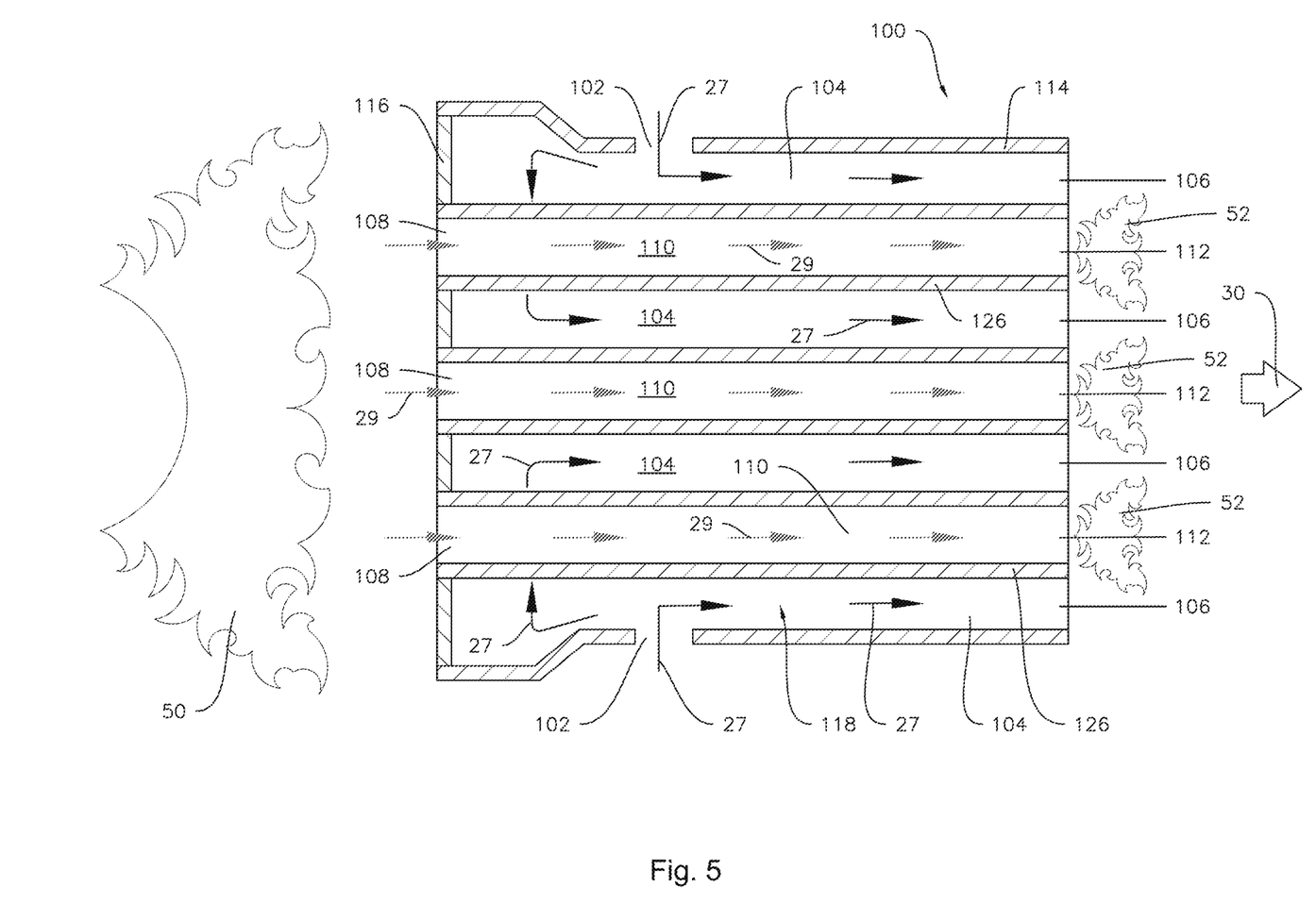
FIG. 5 is a section view of a heat exchanger according to at least one embodiment of the present disclosure.
Figure 6:
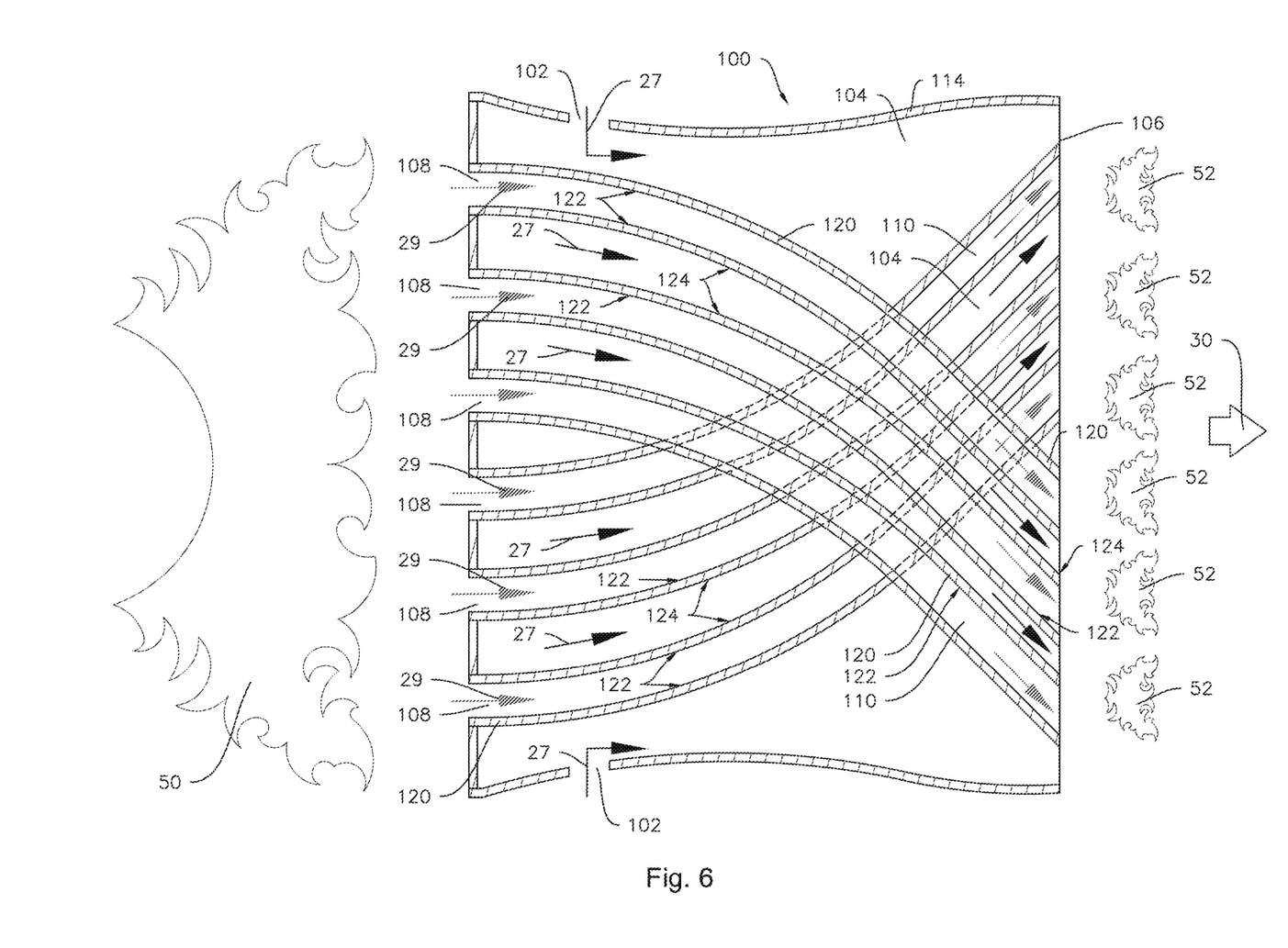
FIG. 6 is a section view of a heat exchanger according to at least one embodiment of the present disclosure.

As may be seen in FIGS. 5 and 6, in various embodiments, the heat exchanger 100 includes a housing 114 with a plurality of radially oriented air inlets 102 formed in the housing 114. The air inlets 102 are in fluid communication with the plurality of air passages 104. The plurality of cooling air passages 104 extend between the plurality of air inlets 102 and a plurality of air outlets 106 in fluid communication with the low temperature zone 43. Also illustrated in FIGS. 5 and 6, each of the combustion gas passages 110 extends between a combustion gas inlet 108 in fluid communication with the rich combustion zone 41 and a combustion gas outlet 112 in fluid communication with the low temperature zone 43.

FIG. 5 illustrates a micro-mixer embodiment of the heat exchanger 100 wherein a plurality of tubes 126 extend through an air plenum 118 defined within the housing 114. In such embodiments, the hot gas passages 110 are defined within the tubes 126 and the portions of air plenum 118 surrounding the tubes 126 define the air passages 104. Accordingly, in at least some embodiments, the cooling air passages 104 are not necessarily distinct passages, rather, the plurality of cooling air passages may be mutually contiguous. As illustrated in FIG. 5, the tubes 126 are generally straight, such that each combustion gas passage 110 of the plurality of combustion gas passages 110 extends along a generally straight line. As noted above, terms such as "generally," in the context of an angle or direction include within ten degrees, e.g., a generally straight line may include up to ten degrees of curvature. For example, the generally straight tubes 126 may subtend an angle up to ten degrees.

As illustrated for example in FIG. 6, each air passage 104 and each combustion gas passage 110 may extend along a curved line. In the illustrated example of FIG. 6, the heat exchanger 100 comprises a plurality of swirler vanes 120 formed therein. Each passage 104, 110, is formed between a pair of adjacent swirler vanes 120. Due to the alternating arrangement of the passages 104, 110, as described above, each swirler vane 120 partially defines a combustion gas passage 100 on a first side 122 and partially defines a cooling air passage 104 on a second side 124. For example, each swirler vane 120 includes a first side 122 and second side 124 opposing the first side 122. Further, the first side 122 of one swirler vane 120 faces the first side 122 of an adjacent swirler vane 120, such that the combustion gas passages 110 are defined between the adjacent swirler vanes 120 on a first side 122 of the swirler vanes 120. Correspondingly, the second side 124 of each swirler vane 120 faces the second side 124 of another adjacent swirler vane 120 and the air passages 104 are defined between the facing second sides 124 of the adjacent swirler vanes 120. The swirler vanes 120 impart angular or circumferential swirl about the axial centerline of the heat exchanger 100 to the flows of the rich combustions gases 29 and the cooling air 27 as they progress through the heat exchanger 100.

In some embodiments, a method of operating a combustor 16 is provided. For example, the method may include supplying a fuel to the combustor 16 from a fuel supply 46 and flowing compressed air 26 to the combustor 16. The method may further include mixing a first portion of the compressed air 26 with the fuel from the fuel supply 46 and combusting the mixed fuel and air in a rich combustion zone 41 to create rich combustion gases 29. The method may also include flowing the rich combustion gases 29 through a heat exchanger 100 downstream of the rich combustion zone 41 and flowing a second portion of the compressed air 26 through the heat exchanger 100 such that the rich combustion gases 29 and the second portion of the compressed air are in thermal communication within the heat exchanger 100. In some embodiments, the combustor 16 may be a single-stage combustor 16 and the fuel supply 46 may be the only fuel source.

In some embodiments, flowing the second portion of the compressed air 26 through the heat exchanger 100 may include flowing the second portion of the compressed air 26 into an air plenum 118 within the heat exchanger 100. In additional embodiments, flowing the rich combustion gases 29 through the heat exchanger 100 may include flowing the rich combustion gases 29 between a plurality of swirler vanes 120 on a first side of the swirler vanes 120, and flowing the second portion of the compressed air through the heat exchanger 100 may include flowing the second portion of the compressed air between the plurality of swirler vanes 120 on a second side of the swirler vanes 120, the second side opposing the first side.

What we claim is:

1. A combustor for a turbomachine, the combustor comprising:
    a rich combustion zone;
    a secondary combustion zone, the secondary combustion zone downstream of the rich combustion zone with respect to a flow of combustion gases through the combustor; and
    a heat exchanger positioned downstream of the rich combustion zone and upstream of the secondary combustion zone with respect to the flow of the combustion gases, the heat exchanger comprising:
        an axial centerline;
        an inlet end;
        an outlet end;
        a plurality of air passages, the plurality of air passages configured to receive a cooling air flow;
        a plurality of air inlets in fluid communication with the plurality of air passages;
        a plurality of air outlets at the outlet end of the heat exchanger, the plurality of air outlets in fluid communication with the plurality of air passages and the secondary combustion zone; and
        a plurality of combustion gas passages for receiving the combustion gases, each of the combustion gas passages extending between a combustion gas inlet at the inlet end in fluid communication with the rich combustion zone and a combustion gas outlet at the outlet end in fluid communication with the secondary combustion zone, the plurality of combustion gas passages in thermal communication with the plurality of air passages, wherein the cooling airflow from the plurality of air passages meets the combustion gas from the plurality of combustion gas passages in the secondary combustion zone, wherein the plurality of combustion gas passages extend along curved lines, and wherein at least two combustion gas passages in the plurality of combustion gas passages extend across one another, without intersecting, within the heat exchanger.

2. The combustor of claim 1, wherein the combustor is in fluid communication with a compressor such that compressed air flows from the compressor to the combustor, the combustor further comprising a fuel nozzle, a first portion of the compressed air comprises a combustion air flow to the fuel nozzle and a second portion of the compressed air comprises a bypass flow to the plurality of air inlets of the heat exchanger.

3. The combustor of claim 1, wherein the combustor is a single-stage combustor.

4. A gas turbine, the gas turbine comprising:
    a compressor;
    a turbine; and
    a combustor disposed between the compressor and the turbine, the combustor comprising:
    a rich combustion zone;
    a secondary combustion zone downstream, the secondary combustion zone of the rich combustion zone with respect to a flow of combustion gases through the combustor;
    a heat exchanger positioned downstream of the rich combustion zone and upstream of the secondary combustion zone with respect to the flow of the combustion gases, the heat exchanger comprising:
    an axial centerline;
    an inlet end;
    an outlet end;
    a plurality of air passages, the plurality of air passages configured to receive a cooling air flow;
    a plurality of air inlets in fluid communication with the plurality of air passages;
    a plurality of air outlets at the outlet end of the heat exchanger, the plurality of air outlets in fluid communication with the plurality of air passages and the secondary combustion zone; and
    a plurality of combustion gas passages for receiving the combustion gases, each of the combustion gas passages extending between a combustion gas inlet at the inlet end in fluid communication with the rich combustion zone and a combustion gas outlet at the outlet end in fluid communication with the secondary combustion zone, the plurality of combustion gas passages in thermal communication with the plurality of air passages, wherein the cooling airflow from the plurality of air passages meets the combustion gas from the plurality of combustion gas passages in the secondary combustion zone, wherein the plurality of combustion gas passages extend along curved lines, and wherein at least two combustion gas passages in the plurality of combustion gas passages extend across one another, without intersecting, within the heat exchanger.

5. A method of operating a combustor of a turbomachine, wherein the combustor is a single-stage combustor, the combustor comprising:

a rich combustion zone;

a secondary combustion zone, the secondary combustion zone downstream of the rich combustion zone with respect to a flow of combustion gases through the combustor; and a heat exchanger positioned downstream of the rich combustion zone and upstream of the secondary combustion zone with respect to the flow of the combustion gases, the heat exchanger comprising:

an axial centerline;

an inlet end;

an outlet end;

a plurality of air passages, the plurality of air passages configured to receive a cooling air flow;

a plurality of air inlets in fluid communication with the plurality of air passages;

a plurality of air outlets at the outlet end of the heat exchanger, the plurality of air outlets in fluid communication with the plurality of air passages and the secondary combustion zone; and a plurality of combustion gas passages for receiving the combustion gases, each of the combustion gas passages extending between a combustion gas inlet at the inlet end in fluid communication with the rich combustion zone and a combustion gas outlet at the outlet end in fluid communication with the secondary combustion zone, the plurality of combustion gas passages in thermal communication with the plurality of air passages, wherein the cooling airflow from the plurality of air passages meets the combustion gas from the plurality of combustion gas passages in the secondary combustion zone, wherein the plurality of combustion gas passages extend along curved lines, and wherein at least two combustion gas passages in the plurality of combustion gas passages extend across one another, without intersecting, within the heat exchanger, the method comprising:

supplying a fuel to the combustor from a fuel supply;

flowing compressed air to the combustor;

mixing a first portion of the compressed air with the fuel from the fuel supply;

combusting the mixed fuel and air in the rich combustion zone to create the combustion gases;

flowing the combustion gases through the plurality of combustion gas passages; and flowing a second portion of the compressed air through the plurality of air passages in the heat exchanger such that the combustion gases and the second portion of the compressed air are in thermal communication within the heat exchanger.

6. The method of claim 5, wherein supplying the fuel comprises supplying a liquid fuel.

* * * * *